(12) United States Patent
Fujino

(10) Patent No.: US 11,505,089 B2
(45) Date of Patent: Nov. 22, 2022

(54) COOLING SYSTEM

(71) Applicant: SUBARU CORPORATION, Tokyo (JP)

(72) Inventor: Takahito Fujino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 295 days.

(21) Appl. No.: 16/710,130

(22) Filed: Dec. 11, 2019

(65) Prior Publication Data

US 2020/0223323 A1 Jul. 16, 2020

(30) Foreign Application Priority Data

Jan. 15, 2019 (JP) .............................. JP2019-004229

(51) Int. Cl.
*B60L 58/26* (2019.01)
*H01M 10/6563* (2014.01)
*H01M 10/625* (2014.01)
*H01M 10/66* (2014.01)
(Continued)

(52) U.S. Cl.
CPC .......... *B60L 58/26* (2019.02); *B60H 1/00564* (2013.01); *H01M 10/613* (2015.04); *H01M 10/625* (2015.04); *H01M 10/6563* (2015.04); *H01M 10/66* (2015.04); *B60H 1/00278* (2013.01); *B60H 2001/003* (2013.01); *H01M 2220/20* (2013.01)

(58) Field of Classification Search
CPC .............. B60L 58/26; B60L 2240/662; B60H 1/00564; B60H 1/00278; B60H 2001/003; B60H 2001/00192; B60H 2001/002; B60H 1/00742; B60H 1/00842; H01M 10/613; H01M 10/625; H01M 10/6563; H01M 10/66; H01M 2220/20; Y02T 10/72; Y02T 90/16
USPC ........................................................ 165/200
See application file for complete search history.

(56) References Cited

U.S. PATENT DOCUMENTS 4,375,754 A * 3/1983 Okura ................ B60H 1/00742
236/49.3
11,279,206 B1 * 3/2022 Mueller .................. B60H 1/247
(Continued)

FOREIGN PATENT DOCUMENTS

EP 2937921 A1 * 10/2015 .......... H01M 6/5038
JP 2007220659 A 8/2007
(Continued)

OTHER PUBLICATIONS

Machine Translation JP 2013-147129A (Year: 2013).*
Japanese Office Action issued in Application No. 2019-004229 dated Jul. 26, 2022; with English Machine Translation.

*Primary Examiner* — Len Tran
*Assistant Examiner* — Gustavo A Hincapie Serna
(74) *Attorney, Agent, or Firm* — Troutman Pepper Hamilton Sanders LLP

(57) ABSTRACT

A cooling system includes air intakes, air intake fans, a duct, and an intake-air controller. The air intakes are separately formed near seats disposed side by side inside a vehicle. The air intake fans individually take in air through the air intakes. The duct guides the air taken in by the air intake fans to a battery. The intake-air controller controls a ratio of intake air flow rates in the air intake fans according to the state of a seated occupant.

5 Claims, 2 Drawing Sheets

(51) Int. Cl.
   *H01M 10/613*   (2014.01)
   *B60H 1/00*   (2006.01)

(56) References Cited

U.S. PATENT DOCUMENTS

| | | | | |
|---|---|---|---|---|
| 2002/0173264 A1* | 11/2002 | Ottman | B60H 1/00478 | 454/142 |
| 2004/0074244 A1* | 4/2004 | Ichishi | B60H 1/00842 | 165/204 |
| 2004/0089006 A1* | 5/2004 | Kamiya | B60H 1/3407 | 62/244 |
| 2006/0032265 A1* | 2/2006 | Shaw | B60N 2/5628 | 62/424 |
| 2007/0175623 A1* | 8/2007 | Park | H01M 10/6563 | 165/202 |
| 2008/0202741 A1* | 8/2008 | Lee | B60H 1/00278 | 165/104.33 |
| 2009/0248204 A1 | 10/2009 | Kikuchi et al. | | |
| 2009/0260905 A1* | 10/2009 | Shinmura | B60K 1/04 | 180/68.1 |
| 2010/0191061 A1* | 7/2010 | Simons | A61B 1/267 | 600/186 |
| 2012/0138260 A1* | 6/2012 | Lee | H01M 10/6563 | 165/41 |
| 2013/0037252 A1 | 2/2013 | Major et al. | | |
| 2015/0060164 A1* | 3/2015 | Wang | H01M 10/625 | 180/65.21 |
| 2017/0087958 A1* | 3/2017 | Nishina | B60H 1/247 | |
| 2017/0326938 A1* | 11/2017 | Motomura | B60H 1/3414 | |
| 2017/0334309 A1 | 11/2017 | Kouno | | |
| 2018/0229582 A1* | 8/2018 | Mazzocco | B60H 1/00885 | |
| 2020/0079173 A1* | 3/2020 | Ostrowski | G06F 17/18 | |
| 2020/0156502 A1* | 5/2020 | Billimoria | B60K 1/04 | |

FOREIGN PATENT DOCUMENTS

| | | | |
|---|---|---|---|
| JP | 2007331609 A | | 12/2007 |
| JP | 2013-147129 A | | 8/2013 |
| JP | 2013147129 A | * | 8/2013 |
| JP | 2016107894 A | | 6/2016 |
| JP | 2017054789 A | | 3/2017 |
| JP | 2018116811 A | * | 7/2018 |

* cited by examiner

| RIGHT SEAT 2a / LEFT SEAT 2b | OCCUPIED | UNOCCUPIED |
|---|---|---|
| OCCUPIED | (b)<br>AIR INTAKE FAN 28a TO<br>AIR INTAKE FAN 28b = 50:50 | (d)<br>AIR INTAKE FAN 28a TO<br>AIR INTAKE FAN 28b = 80:20 |
| UNOCCUPIED | (c)<br>AIR INTAKE FAN 28a TO<br>AIR INTAKE FAN 28b = 20:80 | (a)<br>AIR INTAKE FAN 28a TO<br>AIR INTAKE FAN 28b = 50:50 |

COOLING SYSTEM

CROSS-REFERENCE TO RELATED APPLICATIONS

The present application claims priority from Japanese Patent Application No. 2019-004229 filed on Jan. 15, 2019, the entire contents of which are hereby incorporated by reference.

BACKGROUND

The disclosure relates to a cooling system for cooling a battery.

A vehicle powered by electricity, such as an electric vehicle, externally receives power and charges a battery installed in the vehicle. It is known that such a battery may reach a high temperature while in use. Thus, in some cases, an air intake fan guides the air in an occupant compartment to a battery to cool the battery.

In addition, techniques of changing an upper limit for an amount of air taken in from an occupant compartment according to the temperature of the air in the occupant compartment are known (e.g., Japanese Unexamined Patent Application Publication No. 2013-147129).

SUMMARY

An aspect of the disclosure provides a cooling system including air intakes, air intake fans, a duct, and an intake-air controller. The air intakes are separately formed near seats disposed side by side inside a vehicle. The air intake fans individually take in air through the air intakes. The duct guides the air taken in by the air intake fans to a battery. The intake-air controller controls a ratio of intake air flow rates in the air intake fans according to the state of a seated occupant.

An aspect of the disclosure provides a cooling system including air intakes, air intake fans, a duct, and circuitry. The air intakes are separately formed near seats disposed side by side inside a vehicle. The air intake fans individually take in air through the air intakes. The duct guides the air taken in by the air intake fans to a battery. The circuitry controls a ratio of intake air flow rates in the air intake fans according to the state of a seated occupant.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the following, an embodiment of the technology is described in detail with reference to the accompanying drawings. Note that the following description is directed to an illustrative example of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiment which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Air, which is a coolant for cooling a battery, is taken in from an occupant compartment through an air intake. Thus, according to the positional relationship between the air intake and an occupant, the sounds produced by the rotation of an air intake fan communicating with the air intake may irritate the occupant.

However, decreasing an intake air flow rate in the air intake fan upon occupancy of a seat causes a decrease in the amount of air to be guided to the battery. This may result in a failure to sufficiently suppress the temperature of the battery from increasing. In this case, not only mileage and the lifespan of the battery decrease, but also the maximum capacity of the battery decreases, which may make it difficult to power the vehicle by electricity.

Thus, it is desirable to provide a cooling system capable of appropriately guiding a sufficient amount of air to a battery while maintaining occupant comfort.

<Cooling System 10>

Figures 1, 2:
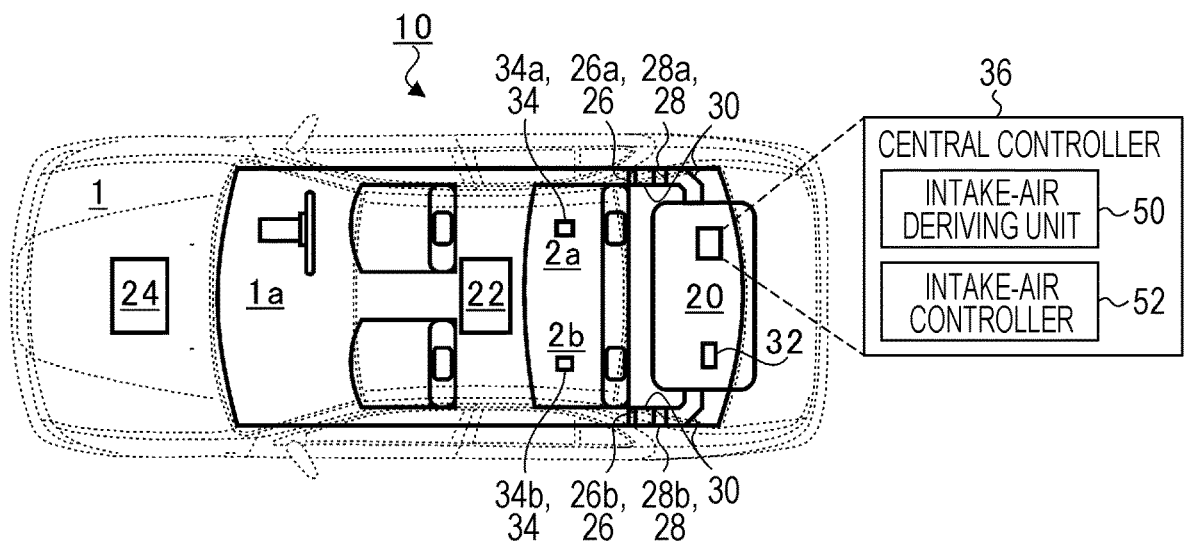
FIG. 1 is a plan view illustrating a configuration of a vehicle that employs a cooling system.
FIG. 2 illustrates ratios of an intake air flow rate in an air intake fan to that in another air intake fan.

FIG. 1 is a plan view illustrating a configuration of a vehicle 1 that employs a cooling system 10. In FIG. 1, the elements of the vehicle 1 are viewed vertically from above. In the vehicle 1, the cooling system 10 includes a battery 20, an inverter 22, a drive motor 24, air intakes 26, air intake fans 28, ducts 30, a temperature sensor 32, seat occupancy sensors 34, and a central controller 36. The vehicle 1 in the embodiment is described as an electric vehicle having the drive motor 24 as a driving source. However, the vehicle 1 may be a hybrid electric vehicle having the drive motor 24 and an engine as driving sources.

The battery 20 is a secondary battery, such as a lithium-ion battery, and is externally charged (externally supplied power is stored in the battery 20). The inverter 22 converts the direct-current power of the battery 20 into alternating-current power and outputs the converted power to the drive motor 24. The drive motor 24 receives the power from the battery 20 via the inverter 22 and drives the vehicle 1 at a torque proportional to the received power.

The battery 20 being charged or discharged reaches a high temperature. Thus, to cool the battery 20, the air in an occupant compartment 1a of the vehicle 1 is guided to the battery 20. The air intakes 26 are separately formed near seats disposed side by side in the occupant compartment 1a. For example, the air intakes 26 are individually formed in the side of each seat or formed to be present near an ear of an occupant seated in each seat. In the embodiment, an air intake 26a and an air intake 26b are formed in a rear portion and in the transverse direction of the occupant compartment 1a, the air intake 26a being formed to the right of a right seat 2a, and the air intake 26b being formed to the left of a left seat 2b.

It should be noted that the case of one person per seat is described in the embodiment. Thus, for example, even when the rear seats in the occupant compartment 1a are formed into one seat, the following description is based on the assumption that seats for the expected number of occupants (e.g., right seat 2a, left seat 2b) are disposed in the transverse direction of the vehicle 1.

The air intake fans 28 (28a, 28b) individually take in air through the air intake 26a and the air intake 26b. That is, the air intake fan 28a takes in air through the air intake 26a, and the air intake fan 28b takes in air through the air intake 26b. The ducts 30 guide the air (coolant) taken in by the air intake fan 28a and the air intake fan 28b to the battery 20. In the embodiment, the air taken in by the air intake fan 28a and the air taken in by the air intake fan 28b are separately guided to the battery 20. However, this is just an example, and the air taken in by the air intake fan 28a and the air taken in by the air intake fan 28b may be collectively guided to the battery 20.

The temperature sensor 32 and the battery 20 are made as a combined unit. The temperature sensor 32 detects the temperature of the battery 20. The seat occupancy sensors 34 detect occupancy of the right seat 2a and occupancy of the left seat 2b by using pressure sensors provided in the respective seating faces of the right seat 2a and the left seat 2b. For example, a seat occupancy sensor 34a detects occupancy of the right seat 2a, and a seat occupancy sensor 34b detects occupancy of the left seat 2b. It should be noted that the seat occupancy sensors 34 are not limited to the pressure sensors, and as long as seat occupancy can be detected, it is possible to employ various existing detection methods, such as detection of wearing of a seatbelt and detection of opening and closing of a door.

The central controller (electronic control unit: ECU) 36 is made of a semiconductor integrated circuit including a central processing unit (CPU), ROM in which, for example, a program is stored, and RAM serving as a work area. The central controller 36 performs integrated control on the entirety of the vehicle 1. In one embodiment, the central controller 36 may also serve as an intake-air deriving unit 50 and an intake-air controller 52.

It should be noted that in the embodiment, the functional units (intake-air deriving unit 50 and intake-air controller 52) are disposed in the central controller 36. However, the arrangement of the functional units is not limited to this embodiment. For example, the functional units in the central controller 36 may be separately disposed in two or more controllers. In this example, the controllers may be connected to each other via a communication bus, such as a CAN.

The intake-air deriving unit 50 derives (calculates) a sufficient amount of air per hour to cool the battery 20 from at least the temperature of the battery 20 detected by the temperature sensor 32. Hereinafter, the amount of air per hour is referred to as an intake air flow rate.

The intake-air controller 52 controls the rotation of each of the air intake fan 28a and the air intake fan 28b according to the intake air flow rate derived by the intake-air deriving unit 50. For example, when a sufficient intake air flow rate to cool the battery 20 is determined to be 1, the intake-air controller 52 determines the intake air flow rate in each of the air intake fan 28a and the air intake fan 28b so that the intake air flow rate in the air intake fan 28a and the intake air flow rate in the air intake fan 28b total 1. It should be noted that since the intake air flow rate in each of the air intake fans 28 is uniquely determined according to the rotation speed, in the embodiment, the intake air flow rate has a close correspondence to rotation speed, and these terms are interchangeable.

As described above, the air intake 26a and the air intake 26b are formed inside the occupant compartment 1a of the vehicle 1a. The air intake 26a communicates with the air intake fan 28a via the duct 30, and the air intake 26b communicates with the air intake fan 28b via the duct 30. Thus, according to the positional relationship between the air intake 26a and an occupant and the positional relationship between the air intake 26b and an occupant, the occupants may experience discomfort with sounds produced by the rotation of the air intake fan 28a and the rotation of the air intake fan 28b, the air intake fan 28a and the air intake fan 28b communicating with the air intake 26a and the air intake 26b, respectively. However, it is not appropriate to decrease the intake air flow rate in the air intake fan 28a and the intake air flow rate in the air intake fan 28b since the decrease in the intake air flow rates in the air intake fans 28 makes it difficult to suppress the temperature of the battery 20 from increasing.

Thus, in the embodiment, the intake air flow rate in the air intake fan 28a and the intake air flow rate in the air intake fan 28b are separately controlled, thereby appropriately guiding a sufficient amount of air to the battery 20 while maintaining occupant comfort.

The intake-air controller 52 controls the ratio of the intake air flow rate in the air intake fan 28a to that in the air intake fan 28b according to the states of seated occupants (the number of the seated occupants and the places in which the occupants are seated), detected by the seat occupancy sensors 34. For example, when either of the right seat 2a and the left seat 2b, which are disposed side by side, is occupied, and the other is unoccupied, the intake-air controller 52 performs control so that an intake air flow rate in the air intake fan 28 communicating with the air intake 26 near the occupied seat is lower than that in the air intake fan 28 communicating with the air intake 26 near the unoccupied seat.

FIG. 2 illustrates ratios of an intake air flow rate in the air intake fan 28a to that in the air intake fan 28b. When none of the right seat 2a and the left seat 2b in the rear portion of the occupant compartment 1a are occupied, as illustrated in (a) in FIG. 2, a sufficient intake air flow rate to cool the battery 20 is evenly divided between the air intake fan 28a and the air intake fan 28b (air intake fan 28a to air intake fan 28b=50:50). Moreover, when both the right seat 2a and the left seat 2b are occupied, as illustrated in (b) in FIG. 2, the sufficient intake air flow rate to cool the battery 20 is evenly divided between the air intake fan 28a and the air intake fan 28b (air intake fan 28a to air intake fan 28b=50:50).

Meanwhile, the following considers the case in which in the rear portion of the occupant compartment 1a, the right seat 2a is occupied, and the left seat 2b is unoccupied. In this case, as illustrated in (c) in FIG. 2, control is performed so that the intake air flow rate in the air intake fan 28a communicating with the air intake 26a near the right seat 2a is lower than that in the air intake fan 28b communicating with the air intake 26b near the left seat 2b. For example, the ratio of the intake air flow rate in the air intake fan 28a to that in the air intake fan 28b is determined to be a ratio of 20 to 80.

The following considers the case in which in the rear portion of the occupant compartment 1a, the left seat 2b is occupied, and the right seat 2a is unoccupied. In this case, as illustrated in (d) in FIG. 2, control is performed so that the intake air flow rate in the air intake fan 28b communicating with the air intake 26b near the left seat 2b is lower than that in the air intake fan 28a communicating with the air intake 26a near the right seat 2a. For example, the ratio of the intake air flow rate in the air intake fan 28a to that in the air intake fan 28b is determined to be a ratio of 80 to 20.

It should be noted that in the above cases, the ratio of the intake air flow rate in the air intake fan 28a to that in the air intake fan 28b is determined to be a ratio of 20 to 80 or a ratio of 80 to 20. However, the ratio is not limited to the exemplified ratios, and any ratio may be determined. For example, the intake-air controller 52 may determine an appropriate ratio in consideration of the degree of discomfort of an occupant and the degree of decrease in the efficiency of the air intake fan 28 that are based on the intake air flow rate in the air intake fan 28. In addition, it is possible to operate either of the air intake fan 28a and the air intake fan 28b and not operate the other.

Thus, the ratio of the intake air flow rate in the air intake fan 28a to that in the air intake fan 28b is changed to decrease the intake air flow rate in the air intake fan 28 communicating with the air intake 26 near an occupied seat, which makes it possible to maintain occupant comfort.

It should be noted that the intake-air controller 52 controls the ratio of the intake air flow rate in the air intake fan 28a to that in the air intake fan 28b so that the total of the intake air flow rate in the air intake fan 28a and the intake air flow rate in the air intake fan 28b is within a target range for a sufficient intake air flow rate to cool the battery 20. That is, even when the intake air flow rate in either of the air intake fans 28 is decreased to maintain occupant comfort, by increasing the intake air flow rate in the other of the intake fans 28, which is far from the occupant, it is possible to maintain overall cooling efficiency. Accordingly, by appropriately guiding a sufficient amount of air within the target range to the battery 20, it is possible to suppress the temperature of the battery 20 from increasing.

<Cooling Method>

Figure 3:
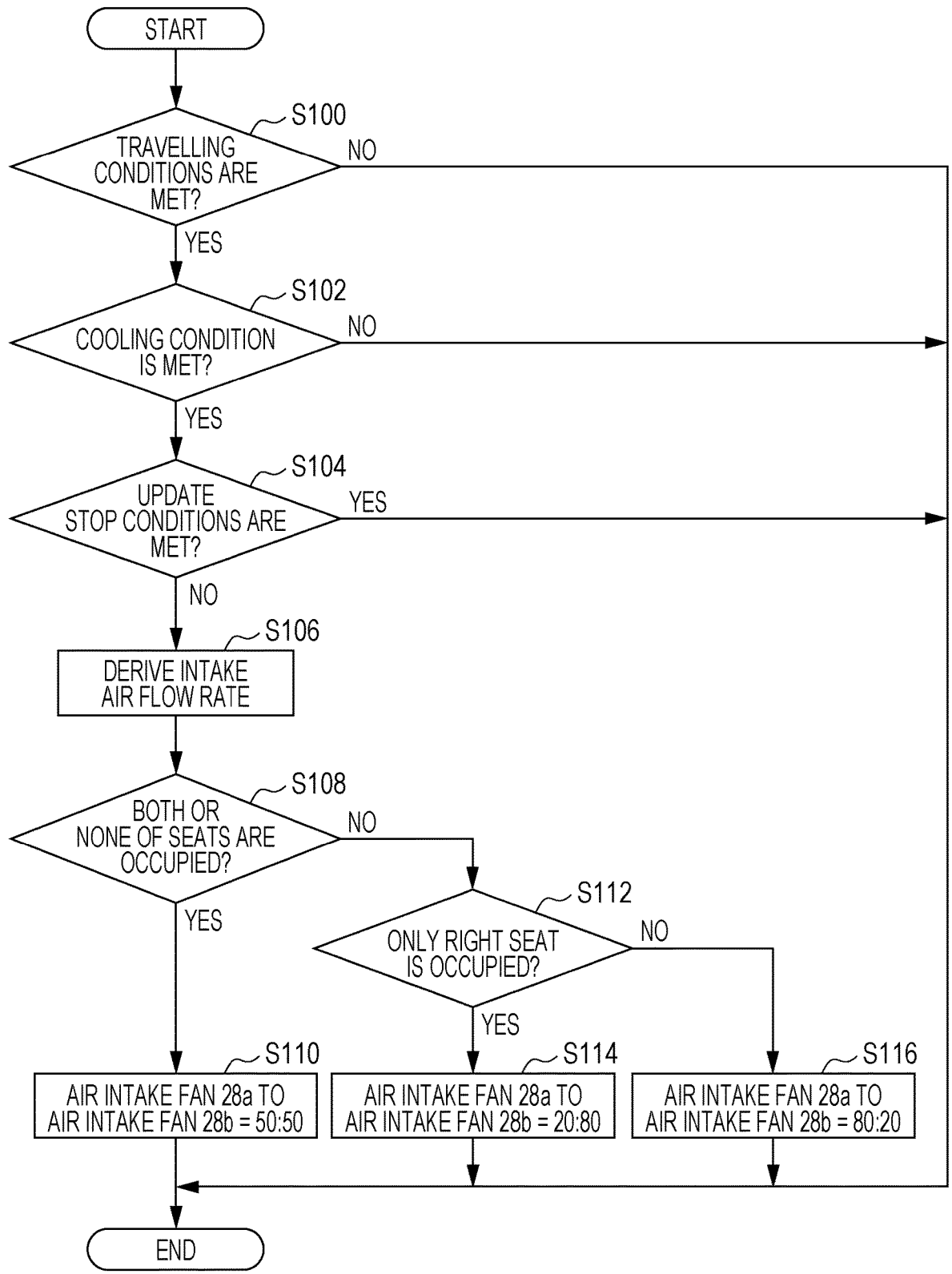
FIG. 3 is a flowchart illustrating a process to perform a battery cooling method.

FIG. 3 is a flowchart illustrating a process to perform the method of cooling the battery 20. The process illustrated in the flowchart is performed at a predetermined interrupt interval (e.g., every minute). It should be noted that processing related to cooling of the battery 20 is described in the embodiment, and detailed explanations for other processing are omitted.

When the interrupt interval has elapsed, the intake-air deriving unit 50 determines whether the vehicle 1 meets predetermined travelling conditions (S100). To cool the battery 20, the travelling conditions are provided to determine whether the vehicle 1 is travelling. For example, the travelling conditions include, for example, that the speed at which the vehicle 1 travels exceeds a first speed (e.g., 10 km/h), that the vehicle 1 is moving forward, and that all the doors of the vehicle 1 are closed.

When determining that the vehicle 1 meets the travelling conditions (YES in S100), the intake-air deriving unit 50 determines whether the battery 20 meets a predetermined cooling condition (S102). Meanwhile, when determining that the vehicle 1 does not meet the travelling conditions (NO in S100), the intake-air deriving unit 50 stops performing the cooling method.

The cooling condition represents an upper limit for the temperature of the battery 20 to bring the temperature of the battery 20 down to within a predetermined range (e.g., a range of 10 degrees Celsius to 45 degrees Celsius). Thus, when the temperature of the battery 20 reaches or exceeds a predetermined temperature (e.g., 35 degrees Celsius), the intake-air deriving unit 50 determines that battery 20 meets the cooling condition.

When determining that the battery 20 meets the predetermined cooling condition (YES in S102), the intake-air deriving unit 50 determines whether the vehicle 1 meets predetermined update stop conditions (S104). The update stop conditions are described later. Meanwhile, when determining that the battery 20 does not meet the cooling condition (NO in S102), the intake-air deriving unit 50 stops performing the cooling method.

When determining that the vehicle 1 does not meet the update stop conditions (NO in S104), the intake-air deriving unit 50 derives a sufficient intake air flow rate to cool the battery 20 from the temperature of the battery 20 detected by the temperature sensor 32 (S106). Meanwhile, when determining that the vehicle 1 meets the update stop conditions (YES in S104), the intake-air deriving unit 50 stops performing the cooling method.

Then, by querying each of the seat occupancy sensor 34a and the seat occupancy sensor 34b, the intake-air controller 52 determines whether both the right seat 2a and the left seat 2b in the rear portion of the occupant compartment 1a are occupied or whether none of the right seat 2a and the left seat 2b are occupied (S108). When determining that both the right seat 2a and the left seat 2b are occupied or that none of the right seat 2a and the left seat 2b are occupied (YES in S108), the intake-air controller 52 controls the rotation of each of the air intake fan 28a and the air intake fan 28b according to the intake air flow rate derived by the intake-air deriving unit 50 so that the ratio of the intake air flow rate in the air intake fan 28a to that in the air intake fan 28b represents a ratio of 50 to 50 (S110).

When determining that either of the right seat 2a and the left seat 2b is occupied (NO in S108), the intake-air controller 52 queries the seat occupancy sensor 34a and determines whether the right seat 2a is occupied (S112). When the right seat 2a is occupied (YES in S112), the intake-air controller 52 controls the rotation of each of the air intake fan 28a and the air intake fan 28b according to the intake air flow rate derived by the intake-air deriving unit 50 so that the ratio of the intake air flow rate in the air intake fan 28a to that in the air intake fan 28b represents a ratio of 20 to 80 (S114).

When the right seat 2a is unoccupied (NO in S112), it is turned out that only the left seat 2b is occupied. Thus, the intake-air controller 52 controls the rotation of each of the air intake fan 28a and the air intake fan 28b according to the intake air flow rate derived by the intake-air deriving unit 50 so that the ratio of the intake air flow rate in the air intake fan 28a to that in the air intake fan 28b represents a ratio of 80 to 20 (S116).

It should be noted that in all of the steps S110, S114, and S116, the intake-air controller 52 controls the ratio of the intake air flow rate in the air intake fan 28a to that in the air intake fan 28b so that the total of the intake air flow rate in the air intake fan 28a and the intake air flow rate in the air intake fan 28b is within the target range for a sufficient intake air flow rate to cool the battery 20.

The ratio of the intake air flow rate in the air intake fan 28a to that in the air intake fan 28b is controlled by constantly monitoring the state of each seated occupant and reflecting changes in the state. For example, when an occupant moves from the right seat 2a to the left seat 2b, the intake-air controller 52 changes the ratio of the intake air flow rate in the air intake fan 28a to that in the air intake fan 28b from a ratio of 20 to 80 to a ratio of 80 to 20. However, a high processing load is placed when the steps S106 to S116 are always performed despite the advance knowledge that the state of the seated occupant remains the same.

In step S104, whether the vehicle 1 meets the update stop conditions is determined. When determining that the vehicle 1 meets the update stop conditions (YES in S104), implementation of the cooling method is discontinued without performing the steps S106 to S116. By doing so, when the state of a seated occupant remains the same, steps S106 to S116 are not performed, which resulting in the suppression of a processing load and power consumption.

When the update stop conditions are met, a state of a seated occupant remains the same (a seated occupant does not move inside the occupant compartment 1*a*). For example, the update stop conditions include, for example, that the speed at which the vehicle 1 travels exceeds a second speed (e.g., 80 km/h), that is, the vehicle 1 travels on an expressway, that a seatbelt is fastened, and that the state in which the seat occupancy sensor 34 does not detect the movement of an occupant has continued for a predetermined period (e.g., five minutes).

Thus, the cooling system 10 described above can suppress the temperature of the battery 20 from increasing by appropriately guiding a sufficient amount of air within the target range to the battery 20, while maintaining occupant comfort.

In addition, a program for causing a computer to function as the intake-air deriving unit 50 and the intake-air controller 52 in the cooling system 10 is provided. Moreover, a storage medium on which the program is recorded, such as a computer-readable flexible disk, a magneto-optical (MO) disk, ROM, a CD, a DVD, or a BD, is provided. Here, the program is a set of instructions for data processing, written in any language and by any writing method.

Thus, although the embodiment of the disclosure is described above with reference to the Drawings, needless to say, the disclosure is not limited to the embodiment. It is clear that those skilled in the art can arrive at various changes or modifications within the scope of the Claims, and these changes and modifications are, of course, included in the technical scope of the disclosure.

For example, in the above embodiment, the air intake fans 28 include the air intake fan 28*a* and the air intake fan 28*b*. However, as long as two or more air intake fans are provided, the air intake fans 28 are not limited to two air intake fans. For example, three or more air intake fans may be provided. The rotation of each of the air intake fans is controlled so that an intake air flow rate in an air intake fan near an occupied seat is lower than that in an air intake fan far from the occupied seat.

The flowchart in FIG. 3 illustrates an example in which only when the update stop conditions are not met in step S104, the ratio of the intake air flow rate in the air intake fan 28*a* to that in the air intake fan 28*b* is updated. However, the timing when update is performed is not limited to the above embodiment, and the ratio may be updated only when a person moves. For example, only when the seat occupancy sensor 34 detects the movement of a person, a ratio of the intake air flow rates may be updated.

It should be noted that the steps in the cooling method in the Specification do not necessarily have to be performed in a time sequence in the order illustrated in the flowchart. A part of the cooling method may be implemented in parallel or by a subroutine.

The disclosure makes it possible to appropriately guide a sufficient amount of air to a battery while maintaining occupant comfort.

The invention claimed is:

1. A cooling system comprising:
a plurality of air intakes separately formed near seats disposed side by side inside a vehicle;
a plurality of air intake fans configured to individually take in air through the plurality of air intakes;
a duct provided to guide the air taken in by the plurality of air intake fans to a battery; and
an intake-air controller configured to control a ratio of intake air flow rates in the plurality of air intake fans according to a state of a seated occupant, wherein
the intake-air controller performs control so that an intake air flow rate in an air intake fan communicating with an air intake near an occupied seat among the seats disposed side by side is lower than an intake air flow rate in an air intake fan communicating with an air intake near an unoccupied seat among the seats disposed side by side.

2. The cooling system according to claim 1, wherein
the intake-air controller controls the ratio of the intake air flow rates in the plurality of air intake fans so that a total of the intake air flow rates in the plurality of air intake fans is within a predetermined range.

3. The cooling system according to claim 1,
wherein when a predetermined update stop condition is satisfied, the intake-air controller does not update the ratio of the intake air flow rates, the predetermined update stop condition being a condition under which the state of the seated occupant remains unchanged.

4. The cooling system according to claim 2, wherein
when a predetermined update stop condition is satisfied, the intake-air controller does not update the ratio of the intake air flow rates, the predetermined update stop condition being a condition under which the state of the seated occupant remains unchanged.

5. A cooling system comprising:
a plurality of air intakes separately formed near seats disposed side by side inside a vehicle;
a plurality of air intake fans configured to individually take in air through the plurality of air intakes;
a duct provided to guide the air taken in by the plurality of air intake fans to a battery; and
circuitry device configured to control a ratio of intake air flow rates in the plurality of air intake fans according to a state of a seated occupant, wherein
the circuitry device is configured to control so that an intake air flow rate in an air intake fan communicating with an air intake near an occupied seat among the seats disposed side by side is lower than an intake air flow rate in an air intake fan communicating with an air intake near an unoccupied seat among the seats disposed side by side.

\* \* \* \* \*